US010723666B2

(12) United States Patent
Maghas et al.

(10) Patent No.: US 10,723,666 B2
(45) Date of Patent: Jul. 28, 2020

(54) METHOD AND APPARATUS FOR OPERATING A COMPOSTER DEVICE

(71) Applicant: WHIRLPOOL CORPORATION, Benton Harbor, MI (US)

(72) Inventors: Rachel Maghas, Kalamazoo, MI (US); Thomas Alan Latack, Baroda, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 195 days.

(21) Appl. No.: 15/936,656

(22) Filed: Mar. 27, 2018

(65) Prior Publication Data

US 2018/0215676 A1 Aug. 2, 2018

Related U.S. Application Data

(62) Division of application No. 15/064,969, filed on Mar. 9, 2016, now Pat. No. 10,000,429.

(51) Int. Cl.
| | |
|---|---|
| *C05F 17/00* | (2020.01) |
| *C12M 3/00* | (2006.01) |
| *C05F 17/979* | (2020.01) |
| *C05F 17/60* | (2020.01) |
| *C05F 17/907* | (2020.01) |
| *C05F 17/971* | (2020.01) |
| *C05F 17/993* | (2020.01) |

(52) U.S. Cl.
CPC .......... *C05F 17/979* (2020.01); *C05F 17/60* (2020.01); *C05F 17/907* (2020.01); *C05F 17/971* (2020.01); *C05F 17/993* (2020.01); *Y02P 20/145* (2015.11); *Y02W 30/43* (2015.05)

(58) Field of Classification Search
CPC ...... C12M 41/34; C12M 41/14; C12M 41/18; C12M 29/24
See application file for complete search history.

(56) References Cited

U.S. PATENT DOCUMENTS

| | | | |
|---|---|---|---|
| 4,374,804 A | 2/1983 | Easter, II | |
| 5,534,042 A | 7/1996 | Tsuchida | |
| 5,587,320 A | 12/1996 | Shindo et al. | |
| 5,710,042 A | 1/1998 | Shindo et al. | |
| 5,766,935 A | 6/1998 | Seagren | |
| 6,284,528 B1 | 9/2001 | Wright | |
| 6,399,366 B1 | 6/2002 | Seagren | |
| 6,627,434 B1 | 9/2003 | McNelly | |

(Continued)

FOREIGN PATENT DOCUMENTS

| | | |
|---|---|---|
| AU | 199714963 B2 | 9/1997 |
| DE | 4208390 A1 | 9/1993 |

(Continued)

OTHER PUBLICATIONS

European Search Report for Counterpart EP17157242.3, dated Jul. 12, 2017.

*Primary Examiner* — Nathan A Bowers
(74) *Attorney, Agent, or Firm* — McGarry Bair PC (57) ABSTRACT

A method for operating a composter device including directing exhaust from a composting container to a reservoir by way of a first fluid pathway, directing ambient air to the reservoir by way of a second fluid pathway, and mixing the exhaust from the first fluid pathway and the ambient air from the second fluid pathway.

16 Claims, 5 Drawing Sheets

(56) References Cited

U.S. PATENT DOCUMENTS

| | | |
|---|---|---|
| 8,129,177 B2 | 3/2012 | Cohn |
| 2005/0044911 A1 | 3/2005 | Shimose |
| 2011/0207218 A1 | 8/2011 | Staheli et al. |
| 2013/0089918 A1 | 4/2013 | Atkinson |
| 2013/0217111 A1 | 8/2013 | Chang |
| 2014/0374064 A1* | 12/2014 | Almalowi ............ B01D 53/002 |
| | | 165/104.13 |
| 2017/0260108 A1 | 9/2017 | Koh |

FOREIGN PATENT DOCUMENTS

| | | |
|---|---|---|
| DE | 19750908 A1 | 5/1999 |
| EP | 0296645 A1 | 12/1988 |
| EP | 1468977 A1 | 10/2004 |
| GB | 2119287 A | 11/1983 |

* cited by examiner

METHOD AND APPARATUS FOR OPERATING A COMPOSTER DEVICE

CROSS-REFERENCE TO RELATED APPLICATIONS

This application is a divisional application of U.S. patent application Ser. No. 15/064,969 entitled "Method and Apparatus for Operating a Composter Device" filed Mar. 9, 2016, now allowed, which is incorporated herein by reference in its entirety.

BACKGROUND

Composting devices are known to implement a composting cycle for biologically and chemically decomposing organic material, such as food waste, into compost for use as a fertilizer and soil amendment. The composting cycle can be implemented in a composting bin by providing water, heat and aeration to the refuse, and can require a period of time for completion. Composting devices usually require a large floor space or a large volume for installation. Further, some composting devices can be a batch type device, therefore cannot be effective in producing compost in a continuous way.

BRIEF SUMMARY

In one aspect, a method of operating a composter having a composting container and a condensate reservoir includes directing exhaust from the composting container to the condensate reservoir by way of a first fluid pathway, directing ambient air to the condensate reservoir by way of a second fluid pathway, mixing the exhaust from the first fluid pathway and the ambient air from the second fluid pathway in the condensate reservoir, and transferring heat from the first fluid pathway to the second fluid pathway prior to the mixing in the condensate reservoir.

DETAILED DESCRIPTION

Figure 1:
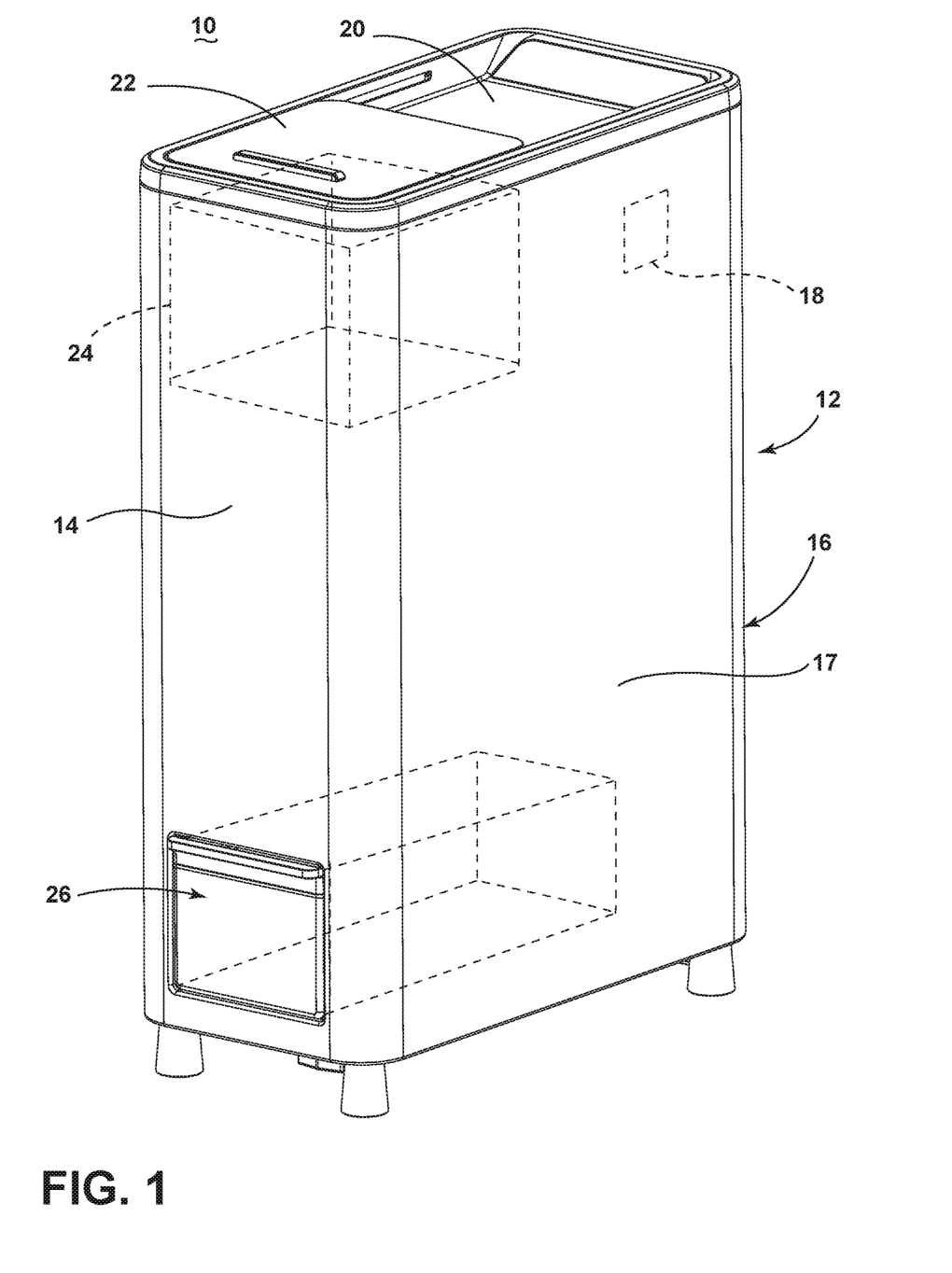
FIG. 1 is a perspective view of a composting device.

FIG. 1 illustrates a perspective view of a composting device 10 or composter for transforming organic material into compost by way of a composting cycle of operation. While a "composting device" or "composter" is described, embodiments of the invention can be equally applicable for similar devices, such as food recyclers or biological waste digesters. The composting device 10 can include a housing 12 having a front wall 14 spaced from a back wall 16, a pair of side walls 17, and a controller 18 located within the housing 12.

A top wall 20 can enclose the housing 12 at the top of the front wall 14, back wall 16, and the pair of side walls 17. The housing 12 can be any structure for enclosing, supporting and protecting the electrical and mechanical components of the composting device 10 including, but not limited to a cabinet and a frame.

The top wall 20 can include a cover 22 slidably mounted to a portion of the top wall 20 for sliding movement between open or closed positions to enable access to interior components of the composting device 10. The cover 22 can be any barrier that provides selective access for inputting organic material into the composting device 10, including, but not limited to a hingedly, slidably or removably mounted door, drawer, panel or lid. While shown in FIG. 1 as coupled to the top wall 20, the cover 22 can be mounted to any exterior wall enclosing the housing 12 including, but not limited to the front wall 14. The top wall 20, as well as the remainder of the housing 12, can be formed of any material suitable for construction of the housing structure including, but not limited to metal such as steel or steel alloy, plastic, composite materials such as a hardened polymer composite material and combinations thereof. Some models of composting devices 10 can include decorative panels that can be mounted on the housing 12 or one or more walls.

When in the open position, the cover 22 provides access to the interior of the housing 12. In the open position, the cover can further expose any element of the composting device 10 interior of the housing 12 including but not limited to one or more water fill inlets for supplying water to the composting device 10 and one or more enzyme dispenser inlets. A composter bin 24 is provided within the housing 12. The composter bin 24 can be disposed beneath the cover 22 such that the cover provides selective access to the composter bin 24 as the cover is opened/closed.

An access drawer 26 is provided and slides in or out through an opening in the front wall 14. The access drawer 26 is a drawer slidably mounted to the housing 12 on a horizontal axis for movement between open and closed positions. It will be understood, however, that access to the interior of the composting device 10 via the front wall 14 can be provided in other ways, including but not limited to, a door pivotally connected to the front wall 14. The access drawer can be detachably mounted to an internal side of the housing 12 and is accessible from outside the housing 12. The access drawer 26 can be removable from the interior of the housing 12 so that the contents thereof can be discharged at will by a user, as for example, by dumping the contents of the drawer 26 onto a garden.

Figure 2:
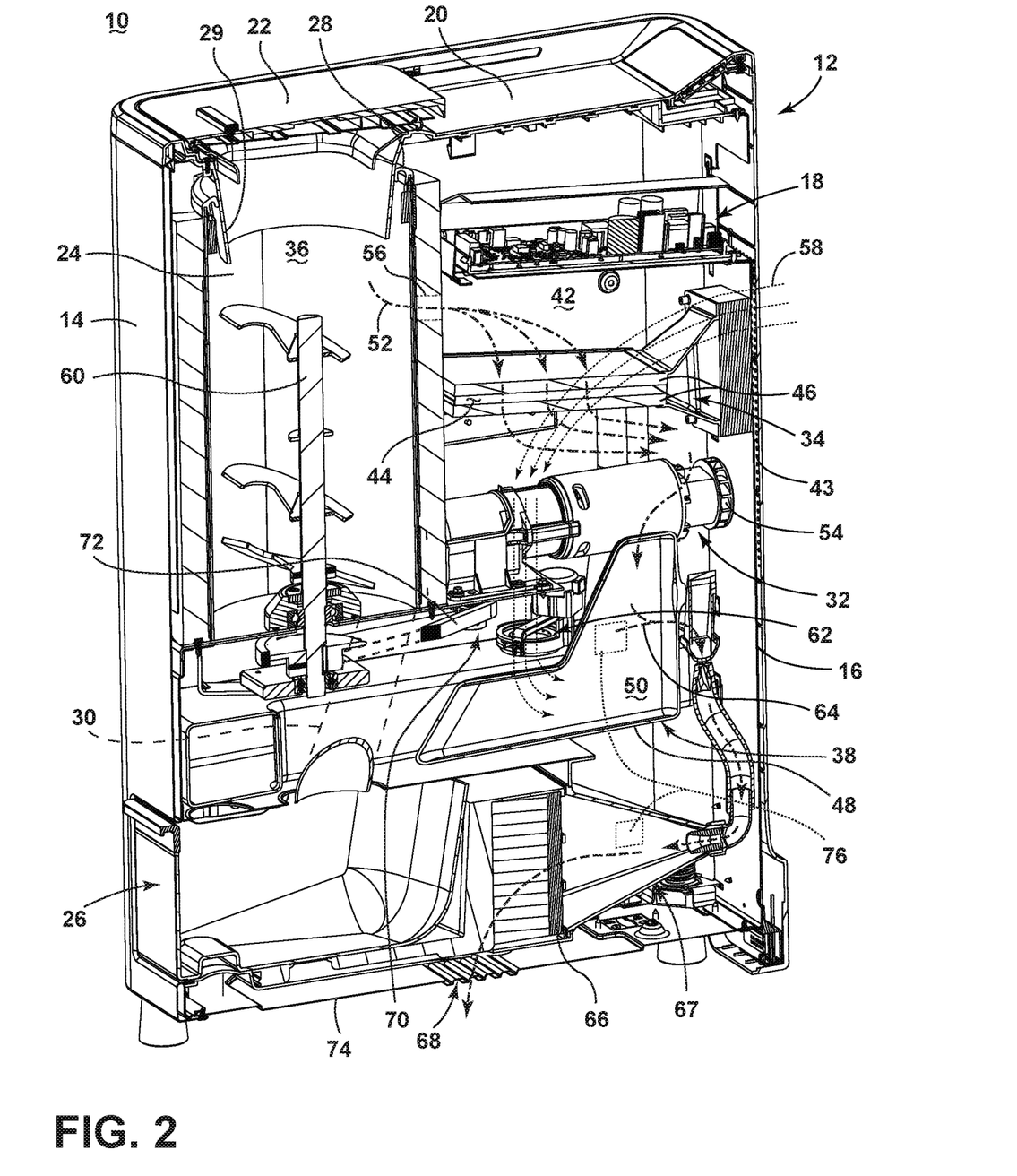
FIG. 2 is an example schematic cross-sectional illustration of the composting device of FIG. 1.

FIG. 2 illustrates a cross-sectional view of the composter device 10 of FIG. 1. The composter bin 24 can be fixedly or removable mounted to the housing 12. The composter bin 24 can define a chamber 36 configured to receive organic material from outside of the composting device 10, either directly or indirectly. The composter bin 24 can include an open top 28 of the bin 24 for receiving refuse through the top wall 20 of composting device 10. As shown, the top wall 20 can also include a funnel 29 located to align with the open top 28 of the composter bin 24 such that refuse placed in through the top wall 20 into the funnel 29 is guided into the open top 28 of the composter bin 24.

The housing 12 can also include a porous wall 43, shown as a portion of the back wall 16, wherein the porous wall 43 is configured to allow ambient air to flow into or out of the interior 42 of the housing 12. While the portion of the back wall 16 has been illustrated having the porous wall, embodiments of the disclosure can include a porous portion of one or more of any of the previously described walls 14, 17, 20.

As shown, a conduit 30 can extend from the composter bin 24, such as from a lower portion of the composter bin 24, toward the access drawer 26. Embodiments of the disclosure can optionally include a transfer mechanism disposed inside the conduit 30 capable of assisting the transfer of material from the composter bin 24 to the access drawer 26. Examples of a transfer mechanism can include, but are not limited to, a rotatable auger, a conveyor, a gravitational chute, and the like.

A reducing mechanism 60 can be provided adjacent or within the composter bin 24. The reducing mechanism 60 can be in the form of a mixer, an auger, a grinding wheel, a grinding blade, any chopping mechanism, or any like device or combination thereof that grinds, shears chops, mixes, breaks, or otherwise reduces the particle sizes of refuse by the operation of the reducing mechanism 60 or uniformly mixing refuse with water, air or enzymes that can be introduced in the composter bin 24 for transforming the refuse into compost.

A motor 70 can be provided inside the cabinet 12 and can be operably coupled to the reducing mechanism 60 to operate, rotate, toggle, or actuate the reducing mechanism 60. As shown, the motor 70 can be operatively coupled with the reducing mechanism 60 by way of a belt or pulley system 72. The motor 70 can be a brushless permanent magnet (BPM) motor. Alternately, other motors such as an induction motor or a permanent split capacitor (PSC) motor can also be used. The motor 70 can be configured to operate the reducing mechanism 60 at different speeds during the cycle of operation to facilitate the reducing or mixing of refuse in the interior of the composter bin 24 or the access drawer 26.

The composter device 10 further includes a heat exchanger 34, an evaporation chamber or condensate reservoir 38, a filter 40, and an air supply system 32, all of which are located within an interior 42 of the housing 12.

The heat exchanger 34 can include a fluid pathway 44 defined between a set of heat conducting elements 46, such as plates, configured such that the heat conducting elements 46 absorb, conduct, pull, or otherwise remove at least a portion of heat from air traversing the fluid pathway 44. At least a portion of the heat removed from the air traversing the fluid pathway 44 can be dissipated, conducted, or radiated into the air occupying the interior 42 of the housing 12. Embodiments of the disclosure can include a heat exchanger 34 having a fluid pathway 44 sealed, closed, or isolated from the interior 42 of the housing 12, such that heat can be removed or transferred out of the fluid pathway 44 without intermixing fluid traversing the pathway 44 with the interior 42.

The condensate reservoir 38 can include a body 48 defining an interior 50 for holding liquid, such as water, and can be fluidly coupled downstream from the fluid pathway 44 of the heat exchanger 34. The condensate reservoir 38 can also include a second fluid coupling, separate from the fluid coupling with the fluid pathway 44 such as a controllable valve 62, configured to provide access to the interior 50 of the reservoir 38. The controllable valve 62 can be communicatively coupled with the controller 18, and can be configured to at least partially open, partially close, or actuate in response to instructions provided by the controller 18. In this sense, the controller 18 can operate the controllable valve 62 to provide selective access to the interior 50 of the reservoir 38. While a controllable valve 62 is described, embodiments of the disclosure can include a fixed opening or fixed port providing uncontrollable access to the interior 50 of the reservoir 38.

The air supply system 32 provides air flow for the composting device 10. The air supply system 32 can include a fan 54 or vacuum pump for supplying, drawing, receiving, or forcing air, for example, through a first fluid pathway (illustrated as arrows 52). The first fluid pathway 52 can include, but is not limited to, a pathway defined to transmit composting air from the chamber 36 of the composter bin 24, for example through an opening 56 in the bin 24 wall, through the fluid pathway 44 of the heat exchanger 34, and into the interior 50 of the condensate reservoir 38. The first fluid pathway 52 can include tubing, closed channels, ducting, or the like to define sealed or contained pathway 52, since the composting air delivered may include undesirable odors or smells emitted as byproducts of the composting cycle of operation.

The air supply system 32 can also include a fan 54 or vacuum pump for supplying drawing, receiving, or forcing air, for example through a second fluid pathway (illustrated as arrows 58). The second fluid pathway 58 can include, but is not limited to, a pathway defined to transmit ambient air from the interior 52 of the composting device 10 into the interior 50 condensate reservoir 38, for example, via the controllable valve 62. In one embodiment, the ambient air can be drawn from ambient air external to the housing 12, such as through the porous wall 43, into the interior 42 of the composting device 10. The ambient air located within the interior 42 of the composting device 10 can also include a portion of air heated by way of the heat exchanger 34 dissipating, conducting, or radiating heat to the interior 42 of the housing 12, as explained above. The fan 54 configured to draw, receive, or force air along the first fluid pathway 52 can be the same fan 54 configured to draw, receive, or force air along the second fluid pathway 58. In this sense, the controllable valve 62 can further be utilized to control the drawing of air along the first fluid pathway 52. For example, if the fan 54 draws a predetermined amount of airflow from the interior 50 of the condensate reservoir 38, the opening or closing of the controllable valve 62 can have the technical effect of redistributing or rebalancing the draw of the airflow from the respective first fluid pathway 52 and the second fluid pathway 58. For instance, restricting the second fluid pathway 58 by way of closing the controllable valve 62 produces additional airflow drawn from the first fluid pathway 52, whereas opening the controllable valve 62 reduces airflow drawn from the first fluid pathway 52. Alternative embodiments can include configurations wherein each fluid pathway 52, 58 as a different source, such as a set of fans 54, for supplying airflow in each respective pathway 52, 58. As used herein, the fan 54 or vacuum pump can be configured to create negative pressure to draw air along at least one of the first fluid pathway 52 or second fluid pathway 58.

The composting device 10 can additionally include a third fluid pathway (illustrated as arrows 64) configured to remove or vent air in the interior 50 of the condensate reservoir 38 to the outside of, or external to the housing 12. For example, the third fluid pathway 64 can include a pathway sealed, closed, or isolated from the interior 42 of the housing 12, and configured to direct airflow through, for example, a filter 66 prior to venting the airflow through an air outlet 68, which is illustrated on a bottom wall 74 of the housing 12. The filter 66 can include a diffuser 67, or can be configured to filter or remove undesirable elements from the airflow downstream of the condensate reservoir 38. Undesirable elements can include, but are not limited to, odors or microbes originating from the composting cycle of operation. Examples of filter 66 materials can include, but are not limited to, charcoal, previously composted material, a biofilter material, or activated carbon. Additional filters 66 can include utilizing ultraviolet lighting or ozone, for example, via an ozone generator, to provide at least a portion of the filtering of undesirable elements from the airflow downstream of the condensate reservoir 38.

In the embodiment illustrated, the air supply system 32 or fan 54 can be located fluidly downstream of the condensate reservoir 38, such that the fan 54 can be configured to use suction force or low pressure to move airflow through the first or second fluid pathways 52, 58. The fan 54 can further be configured to push or force air through the third fluid pathway 64, which can be downstream from the condensate reservoir 38 or the fan 54. Alternative configurations can be included.

The composting device 10 can additionally include a number of sensor 76 positioned throughout the device 10 communicatively coupled with the controller 18 to sense or measure characteristics, values, or indicators utilized to control or operate the device 10 or the composting cycle of operation. The sensors 76 can include, but are not limited to, humidity sensors, temperature sensors, moisture sensors, level sensors, odor sensors, pH sensors, water level sensors, weight sensors, airflow sensors, and the like. Two non-limiting examples of sensor 76 placement are illustrated to include in the interior 50 of the condensate reservoir 38 or downstream of the condensate reservoir 38, such as at the diffuser 67 or proximate to the filter 66. Additional examples of sensor 76 placement can be included.

Figure 3:
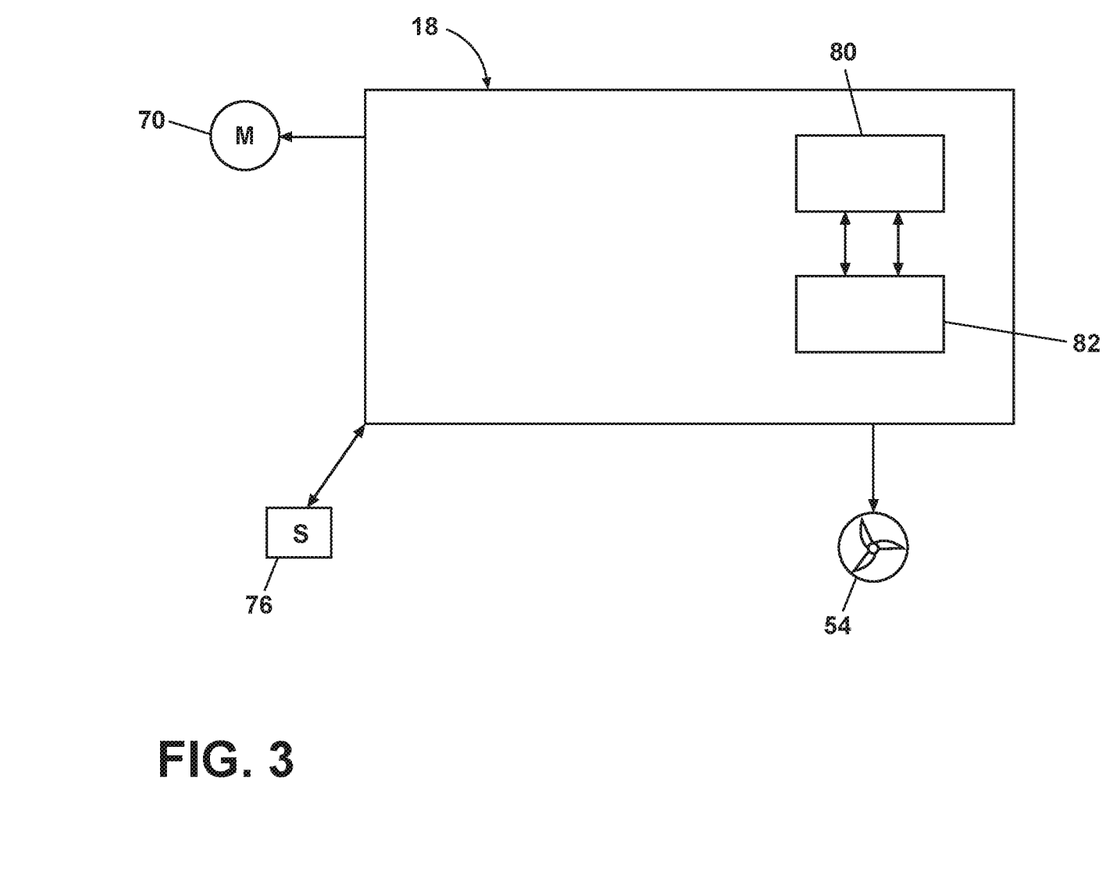
FIG. 3 is a block diagram of a control system of the composting device.

Referring now to FIG. 3, a schematic of the controller 18 for controlling the operation of the composting device 10 is illustrated. The controller 18 can be provided with a memory 80 and a central processing unit (CPU) 82. The memory 80 can be used for storing the control software that is executed by the CPU 82 in completing a cycle of operation using the composting device 10 and any additional software. The memory 80 can also be used to store information, such as a database or table, and to store data received from one or more components of the composting device 10 that can be communicably coupled with the controller 18.

The controller 18 can be operably coupled with one or more components of the compositing device 10 for communicating with and controlling the operation of the component to complete a cycle of operation. For example, the controller 18 can be operably coupled with the motor 70 to control the operation of the motor 70. In another example, the controller 18 can be operably coupled to the fan 54 for selectively operating the of the first, second, or third fluid pathways 52, 58, 64. The controller 18 can also be coupled with the one or more sensors 76 provided in one or more of the systems of the composting device 10 to receive input from the sensors.

Figure 4:
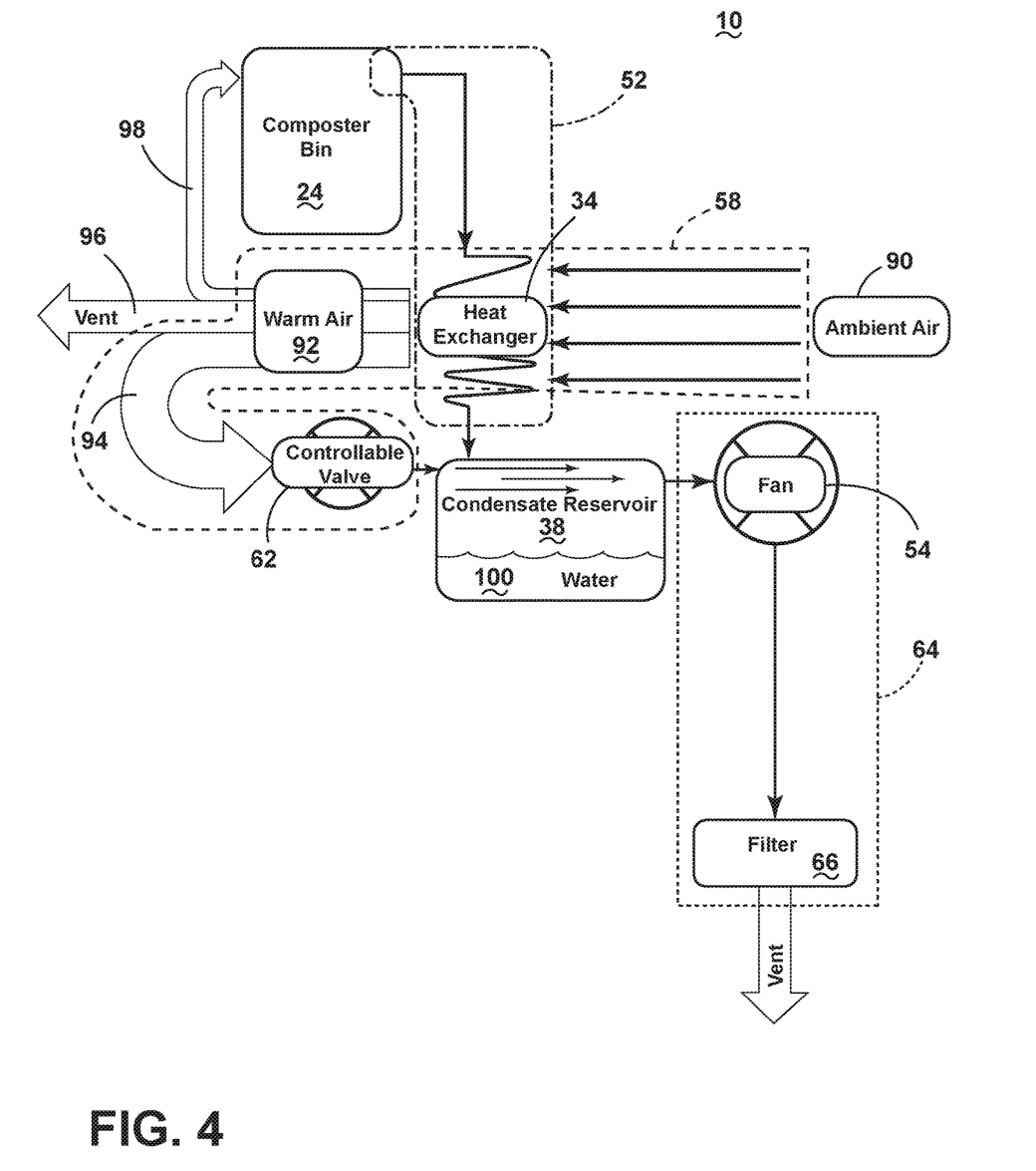
FIG. 4 is a schematic illustration of the operation of the composting device.

FIG. 4 illustrates a schematic view of the operation of the composting device 10. As shown, the composter bin 24 is fluidly coupled with the condensate reservoir 38 by way of the enclosed or sealed first fluid pathway 52 passing through the heat exchanger 34. Additionally, ambient air 90 or outside air is fluidly coupled with the condensate reservoir 38 by way of the second fluid pathway 58, passing and absorbing at least a portion of heat from the heat exchanger 34 to define warm air 92. A first portion 94 of the warm air 92 can be selectively directed through the controllable valve 62 to the condensate reservoir 38. Also shown, a second portion 96 of the warm air 92 can be vented from the composting device 10, and a third portion 98 of the warm air 92 can be optionally or selectively directed back to the composter bin 24 for further composting activity.

During a composting cycle of operation, refuse, such as organic food waste or leaves, can be provided by the user to the interior of the composter bin 24 through the opening or cover 22 of the top wall 20. The refuse can be supplied to the interior of the composter bin 24 over a period of time until the volume or weight of the refuse satisfies a predetermined threshold, as determined by a level sensor or a weight sensor. The composting cycle can begin when the level of refuse reaches a predetermined level or it can begin as soon as refuse is placed in the composter bin 24. Alternatively, the composting cycle can initiate as long as the level sensor or weight sensor determines that the refuse is received in the composter bin 24.

The refuse can be uniformly mixed and decimated by rotating the reducing mechanism 60 positioned at the lower portion of the composter bin 24 at a predetermined speed according to the cycle of operation. Reducing can occur periodically or continuously. The refuse can also be provided with heat, water or aeration according to the cycle of operation to promote the decomposition of the refuse.

During the composting process, an optional heating element can be controllably operated to maintain the temperature in the composter bin 24 within a predetermined temperature range. The predetermined temperature range can vary with the progress of composting process, and the temperature can be determined by a temperature sensor. Further, the relative humidity level in the composter bin 24 can also be controlled by controllably operating the optional heating element to enhance the overall rate of composting process.

While the composting process proceeds in the composter bin 24, partially composted refuse is transferred from the composter bin 24 to the access drawer 26. Enzymes can be provided to the composter bin 24, the access drawer 26, or both by an enzyme dispenser for continuing and enhancing the composting process. The refuse can be further decomposed by controlling the amount of water and aeration in the refuse in the access drawer 26.

Composting air, that is, air generated by the composting cycle of operation, can enter the first fluid pathway 52 from the composter bin 24, or can be drawn by the fan 54 at, for example, a rate between 0.25 cubic feet per minute (CFM) and 1 CFM, and can have a temperature of 70 degrees Celsius with a high humidity. The composting air leaving the composter bin 24 can further include undesirable elements, as described above. While "humidity" is described, embodiments of the disclosure can include sensing, measuring, or estimations of the amount of water vapor in a portion or air. For example, embodiments of the disclosure can be described in terms of "absolute humidity," which is the water content of air at a given temperature, "relative humidity," which is the current absolute humidity relative to the maximum absolute humidity for that temperature, or "specific humidity," which is ratio of the water vapor content of the mixture to the total air content on a mass basis. The examples presented herein will be described in relative humidity examples, but alternative humidity measurement or descriptions can be included. For example, the composting air entering the first fluid pathway from the composter bin 24 can include 100 percent relative humidity.

As the composting air in the first fluid pathway 52 moves through the heat exchanger 34, the temperature of the composting air can be cooled or reduced by 20 to 30 degree Celsius. The reduction in temperature of the composting air, in turn, causes condensation, or excess moisture or water vapor, to fall out of or condense from the air, gathering as liquid. The liquid condensation can also flow through the first fluid pathway 52 exiting the heat exchanger 34, and gather in the condensate reservoir 38, illustrated as water 100. While "water" is described, embodiments of the disclosure can include examples wherein the water 100 is not pure water, and can include amounts of compost, odor and bacteria. The cooled composting air traverses the portion of the first fluid pathway 52 downstream from the heat exchanger 34, and ultimately enters the condensate reservoir 38. In this sense, a first airflow passes from the composting bin 24, through the heat exchanger 34 where heat is removed from the first airflow and condensation forms, and the first airflow and condensation are each provided to the condensate reservoir 38. Additionally, at least a portion of the first fluid pathway 52 can include a liquid pathway configured to deliver the condensate or water 100 to the reservoir 38.

Ambient air 90 is entering the second fluid pathway 58 can be drawn by the fan 54 or forced across the heat exchanger 34 at 20 to 30 CFM and can have a nominal temperature of 20 degrees Celsius with a relative humidity of 50 percent. The ambient air 90 is used to cool the heat exchanger 34, which in turn, raises the temperature of the ambient air 90 to the warm air 92 to, for example, 42 degrees Celsius, and lower the relative humidity of the warm air to 14 percent. A first portion 94 of the warm air 92 can be directed into the condensation reservoir 38 by way of the selectively operable controllable valve 62. In this sense, a second airflow includes ambient air 90 passing the heat exchanger 34, warming the ambient air 90, which can further be directed into the condensate reservoir 38. Additionally, the second fluid pathway 58 is fluidly isolated from the first fluid pathway 52, and the second fluid pathway 58 is in heat transfer juxtaposition with the first fluid pathway 52.

The controllable valve 62 operates to provide, match, maintain, or regulate a target characteristic of air passing through the condensate reservoir 38. Operating the valve 62 to match, maintain, or regulate the target characteristic of air passing through the reservoir 38 enables the condensation or water 100 to evaporate over an evaporation cycle of operation, which can be different from the composting cycle of operation. For example, a composting cycle of operation for 3.5 kilograms of refuse can last for 24 hours. Conversely, evaporation of 1.5 liters of water 100 (i.e. an example amount of water 100 condensed during a 3.5 kilograms of refuse composting cycle) in the condensate reservoir 38 can take approximately 5.5 days according to embodiments of the disclosure. In this example, the fan 54 can be configured to operate, for example, by the controller 18, for the evaporation period, even if after the composting cycle of operation has completed. Alternatively, the fan 54 can be configured to operate selectively or intermittently, as needed, or as controlled by the controller 18. The target characteristic of air can include at least one of a temperature characteristic or a humidity characteristic.

The target characteristic of air passing through the condensate reservoir 38 can include a mixture of air received from the first fluid pathway 52 and the second fluid pathway 58 at, for example, a target temperature characteristic between 41 degrees Celsius and 43 degrees Celsius, and having a target humidity characteristic of a relative humidity between 27 percent and 37 percent. The actual characteristics of the air passing through the condensate reservoir 38 can be sensed or measured directly or indirectly by, for example, the sensor 76 positioned in the interior 50 of the reservoir 38. The controller 18 can be configured to receive the sensed or measured actual characteristics of the air, and adjust, modify, actuate, operate, open, or close the controllable valve 62 to modify the air mixture passing thorough the reservoir 38, if needed, based at least on the characteristics received from the sensor 76. In this sense, the first airflow received via the first fluid pathway 52 is modified by the second airflow controllably received via the second fluid pathway 58 and controllable valve 62 to match, maintain, or attain the target characteristic of air passing through the reservoir 38.

The mixture of air from the first and second fluid pathways 52, 58 is further drawn or forced out of the condensate reservoir 38 by the fan 54, and into the third fluid pathway 64, wherein the third airflow traversing the third fluid pathway 64 can pass through the filter 66, or additional optional components including, but not limited to, an ozone generator or a desiccant, before being vented outside of the housing 12. Example characteristics of the third airflow traversing the third fluid pathway 64 can include a relative humidity less than 60 percent.

Alternative embodiments of the disclosure can include configurations wherein, for example, the actual characteristics of the air passing through the condensate reservoir 38 can be sensed or measured directly or indirectly by the sensor 76 positioned downstream of the reservoir 38, such as in the third fluid pathway 64. In this embodiment, the controller 18 can be configured to operate the controllable valve 62 to match, maintain, or attain a target characteristic of air passing through the third fluid pathway, which can be different than the target characteristic of air passing through the reservoir 38. For example, the airflow traversing the third fluid pathway 64 can having a higher target humidity characteristic than the airflow passing through the reservoir 38, since the airflow traversing the third fluid pathway 64 will include at least some additional evaporate from the reservoir 38.

While examples of temperature values, humidity values, and airflow values have been described at various locations of the composter device, additional or alternative values can be included, and embodiments of the disclosure are not limited to only those examples provided. Likewise, embodiment of the disclosure can include additional or alternative target characteristics, such as target temperature or target humidity characteristics.

Figure 5:
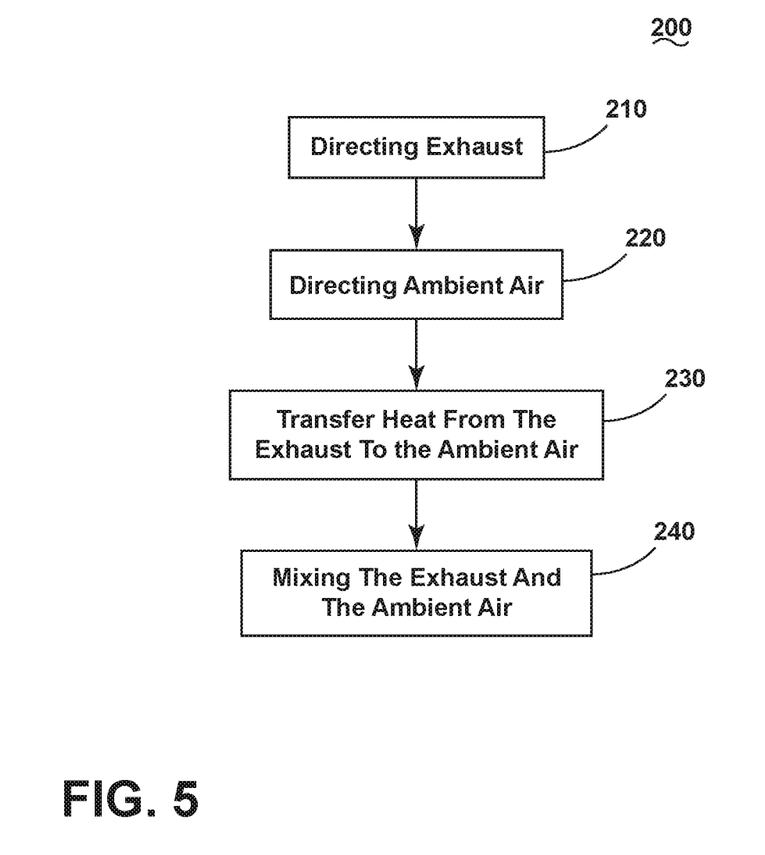
FIG. 5 is a flowchart illustrating a method of operating the composting device.

FIG. 5 illustrates a method 200 of operating a composter 10 having a composter bin 24 or container and a condensate reservoir 38. In a first step 210, the method 200 includes directing exhaust from the composter bin 24 to the condensate reservoir 38 by way of the first fluid pathway 52. In a second step 220, the method 200 includes directing ambient air 90 to the condensate reservoir 38 by way of a second fluid pathway 58. In a third step 230, the method 200 includes transferring heat from the first fluid pathway 52 to the second fluid pathway 58 prior to the mixing in the condensate reservoir 38. In a fourth step 240, the method 200 includes mixing the exhaust from the first fluid pathway 52 and the ambient air 90 from the second fluid pathway 58 in the condensate reservoir 38.

Alternative examples of the method 200 can be included in embodiments of the disclosure. For example, the transferring step 230 can include lowering the relative humidity of the exhaust, via the heat exchanger 34, or condensing liquid from the exhaust while the first fluid pathway 52 directs the condensed liquid to the condensate reservoir 38. In another example of the method 200, the mixing step 240 can include selectively operating the controllable valve 62 along the second fluid pathway 58 to control the ratio of exhaust and ambient air 90 in the condensate reservoir 38. In this example embodiment, the selectively operating the controllable valve 62 can be configured to create a mixture of air in the condensate reservoir 38 configured to evaporate liquid or water 100 in the reservoir 38 over multiple days, as explained above. Additionally, the method 200 can include venting the mixture of the air in the condensate reservoir 38 outside of the composting device 10 or into the ambient air 90 by way of the third fluid pathway 64. In yet another embodiment of the method 200, the directing the ambient air step 220 can include directing ambient air 90 through the porous wall 43 of the composter device 10 to the interior 42, and directing air in the interior 42 of the device 10 to the condensate reservoir 38.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method.

The embodiments disclosed herein provide a composter and method for operating a composter. One advantage that can be realized in the above embodiments is that the above described embodiments are configured to provide a composting device capable of pulling air through the compost bin to dry the composting materials during the composting cycle of operation. By fluidly sealing or isolating the first fluid pathway, the composting air having odor or other undesirable characteristics can be cooled, and transferred along the fluid pathways to the filter, which removes the undesirable characteristics, without exposing a user or an environment to those undesirable characteristics.

Another advantage of the above-described embodiments is that the compost device can effectively manage moisture removed during the composting cycle of operation by using the heat exchanger to condense a portion of the moisture into the condensate reservoir, where it can be slowly evaporated over a period of time. This purposeful condensing prevents unintended or unanticipated condensing downstream of the fluid pathways, which can damage components such as the fan, filter, or otherwise expose a user's environment to the condensation (e.g. a kitchen floor that gathers condensation puddles when operating a composting cycle of operation).

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure.

This written description uses examples to disclose embodiments of the invention, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a composter having a composting container and a condensate reservoir, comprising:

directing exhaust from the composting container to the condensate reservoir by way of a first fluid pathway;

directing ambient air to the condensate reservoir by way of a second fluid pathway fluidly isolated from the first fluid pathway;

drawing air along the first fluid pathway and along the second fluid pathway with a fan;

mixing the exhaust from the first fluid pathway and the ambient air from the second fluid pathway in the condensate reservoir; and transferring heat from the first fluid pathway to the second fluid pathway prior to the mixing in the condensate reservoir.

2. The method of claim 1 wherein the transferring heat lowers the relative humidity of the exhaust.

3. The method of claim 1 wherein the transferring heat condenses liquid from the exhaust, and the first fluid pathway directs the condensed liquid to the condensate reservoir.

4. The method of claim 1 wherein the mixing further includes selectively controlling the ratio of exhaust and ambient air in the condensate reservoir.

5. The method of claim 4 wherein the selectively controlling the ratio is controlled to create a mixture of air in the condensate reservoir effective to evaporate liquid in the condensate reservoir over multiple days.

6. The method of claim 5 further includes venting the mixture of air in the condensate reservoir to the ambient air by way of a third fluid pathway.

7. The method of claim 1 wherein directing ambient air to the condensate reservoir further includes directing ambient air through a porous wall of the composter to an interior of the composter, and directing air in the interior of the composter to the condensate reservoir.

8. The method of claim 6 wherein the third fluid pathway includes a pathway configured to direct the mixture of air in the condensate reservoir through a filter prior to venting.

9. The method of claim 6 wherein e fan moves the mixture of air in the condensate reservoir through the third fluid pathway.

10. The method of claim 1 wherein tea fan generates a low pressure to draw air along the first fluid pathway and along the second fluid pathway.

11. The method of claim 4 wherein selectively controlling the ratio of exhaust and ambient air in the condensate reservoir further includes controlling a controllable valve and operating the controllable valve based on the at least one of a temperature sensor or humidity sensor.

12. The method of claim 1 wherein directing exhaust from the composting container to the condensate reservoir by way of a first fluid pathway further includes drawing the exhaust by the fan.

13. The method of claim 12 wherein drawing the exhaust further includes drawing the exhaust at a rate between 0.25 cubic feet per minute and 1 cubic feet per minute.

14. The method of claim 1 wherein the transferring heat reduces the temperature of the exhaust from the first fluid pathway by 20 to 30 degrees Celsius.

15. The method of claim 1 wherein directing ambient air to the condensate reservoir by way of a second fluid pathway includes drawing the ambient air by the fan.

16. The method of claim 15 wherein drawing the ambient air further includes drawing the ambient air at a rate between 20 cubic feet per minute to 30 cubic feet per minute.

* * * * *